(12) United States Patent  
Shingai

(10) Patent No.: US 8,348,262 B2  
(45) Date of Patent: Jan. 8, 2013

(54) DOCUMENT FEEDING DEVICE

(75) Inventor: Hiroyuki Shingai, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 58 days.

(21) Appl. No.: 12/394,074

(22) Filed: Feb. 27, 2009

(65) Prior Publication Data

US 2009/0218750 A1   Sep. 3, 2009

(30) Foreign Application Priority Data

Feb. 29, 2008   (JP) ................................. 2008-050039

(51) Int. Cl.  
*B65H 31/08* (2006.01)
(52) U.S. Cl. ...................................................... 271/212
(58) Field of Classification Search .................. 271/212, 271/3.14, 220; 399/367  
See application file for complete search history.

(56) References Cited

U.S. PATENT DOCUMENTS

| | | | | |
|---|---|---|---|---|
| 4,067,568 A * | 1/1978 | Irvine | ........................... | 271/176 |
| 4,822,021 A | 4/1989 | Giannetti et al. | | |
| 5,078,383 A * | 1/1992 | Shiina et al. | ................... | 271/212 |
| 5,092,576 A * | 3/1992 | Takahashi et al. | ........... | 271/3.11 |
| 6,095,517 A * | 8/2000 | Dinatale | ....................... | 271/212 |
| 6,412,774 B1 * | 7/2002 | Saito et al. | ..................... | 271/220 |
| 2005/0207809 A1 * | 9/2005 | Ho et al. | ........................ | 399/367 |
| 2007/0063427 A1 | 3/2007 | Hong | | |
| 2007/0210512 A1 * | 9/2007 | Sakakibara et al. | .......... | 271/314 |
| 2009/0218748 A1 * | 9/2009 | Kusama | ........................ | 271/3.14 |
| 2009/0322010 A1 * | 12/2009 | Kusama | ........................ | 271/3.14 |

FOREIGN PATENT DOCUMENTS

| | | | |
|---|---|---|---|
| JP | 61-178366 | | 8/1986 |
| JP | 63-057469 | | 3/1988 |
| JP | 53-056155 | * | 4/1988 |
| JP | 63-056155 | | 4/1988 |
| JP | 02-502715 | | 8/1990 |
| JP | 04-140280 | | 5/1992 |
| JP | 06-255857 | | 9/1994 |
| JP | 07-008356 | | 2/1995 |
| JP | 2002-211814 | | 7/2002 |
| JP | 2006-232460 | | 9/2006 |
| JP | 2006232460 | * | 9/2006 |
| JP | 2007-238252 | | 9/2007 |

OTHER PUBLICATIONS

Office Action issued in corresponding Chinese application No. 200910007926.2 mailed Dec. 27, 2010.  
Search Report for corresponding European Patent Application No. 09002767.3 mailed Jan. 6, 2012.

* cited by examiner

*Primary Examiner* — Patrick Cicchino  
(74) *Attorney, Agent, or Firm* — Banner & Witcoff, Ltd.

(57) ABSTRACT

A document feeding device for feeding documents comprises a document input tray on which documents to be fed are placed, a document output tray to which the documents are ejected, and a feeding mechanism which is provided for a feeding path connecting the document input tray and the document output tray via a scanning position and feeds each document from the document input tray to the scanning position and from the scanning position to the document output tray. The document output tray includes a tray part which holds the ejected documents, a projecting part which pushes up a part of the ejected documents on the upstream side in a feeding direction and thereby lifts an upstream end of the ejected documents, and a pressing member which makes contact with the ejected documents from above at a position on the downstream side of the projecting part's apex in the feeding direction.

13 Claims, 7 Drawing Sheets

DOCUMENT FEEDING DEVICE

CROSS-REFERENCE TO RELATED APPLICATION

This application claims priority under 35 U.S.C. §119 from Japanese Patent Application No. 2008-050039 filed on Feb. 29, 2008. The entire subject matter of the application is incorporated herein by reference.

BACKGROUND

1. Technical Field

Aspects of the present invention relate to a document feeding device for feeding a document from a document input tray to a document output tray via a scanning position of a document scanner.

2. Prior Art

There exists a document feeding device designed to eject each document (after undergoing document scanning) to the document output tray while sliding it under documents already ejected to the document output tray in order to arrange scan target surfaces of the documents in the order of ejection (see Japanese Patent Provisional Publication No. 2007-238252, for example).

SUMMARY OF THE INVENTION

In such a document ejection method, as the number of documents already ejected to the document output tray increases, frictional resistance between the documents increases due to the weight of the stack of documents and it becomes difficult for subsequently ejected documents to slide under the stack of ejected documents, by which the rear end of each document newly ejected to the document output tray gradually approaches a pair of ejection rollers and the rear end can make contact with the ejection rollers. If such contact occurs, noise or damage to the rear end of the document can be caused by the rotation of the ejection rollers.

In consideration of the above problems, the aspects of the present invention are advantageous in that a document feeding device capable of preventing the contact of the rear end of an ejected document with the pair of ejection rollers can be provided.

In accordance with aspects of the present invention, there is provided a document feeding device for feeding documents, comprising a document input tray on which documents to be fed are placed, a document output tray to which the documents are ejected, and a feeding mechanism which is provided for a feeding path connecting the document input tray and the document output tray via a scanning position and feeds each document from the document input tray to the scanning position and from the scanning position to the document output tray. The document output tray includes a tray part which holds the ejected documents, a projecting part which pushes up a part of the ejected documents on the upstream side in a feeding direction and thereby lifts an upstream end of the ejected documents, and a pressing member which makes contact with the ejected documents from above at a position on the downstream side of the projecting part's apex in the feeding direction.

In the document feeding device configured as above, by the projecting part and the pressing member which makes contact with the ejected documents from above at a position on the downstream side of the projecting part's apex in the feeding direction, a part of the ejected documents on the downstream side of the apex in the feeding direction is pressed downward and a part (rear end part) of the ejected documents on the upstream side of the apex in the feeding direction is lifted up, by which the rear end of the ejected documents can be separated from the pair of ejection rollers. Consequently, the contact of the rear end of an ejected document with the pair of ejection rollers can be prevented, by which the noise and damage to the rear end (which can be caused by contact of the rear end with the pair of ejection rollers) can be prevented.

Other objects, features and advantages of the aspects of the present invention will become more apparent from the consideration of the following detailed description taken in conjunction with the accompanying drawings.

BRIEF DESCRIPTION OF THE ACCOMPANYING DRAWINGS

DETAILED DESCRIPTION OF THE EMBODIMENT

Figure 1:
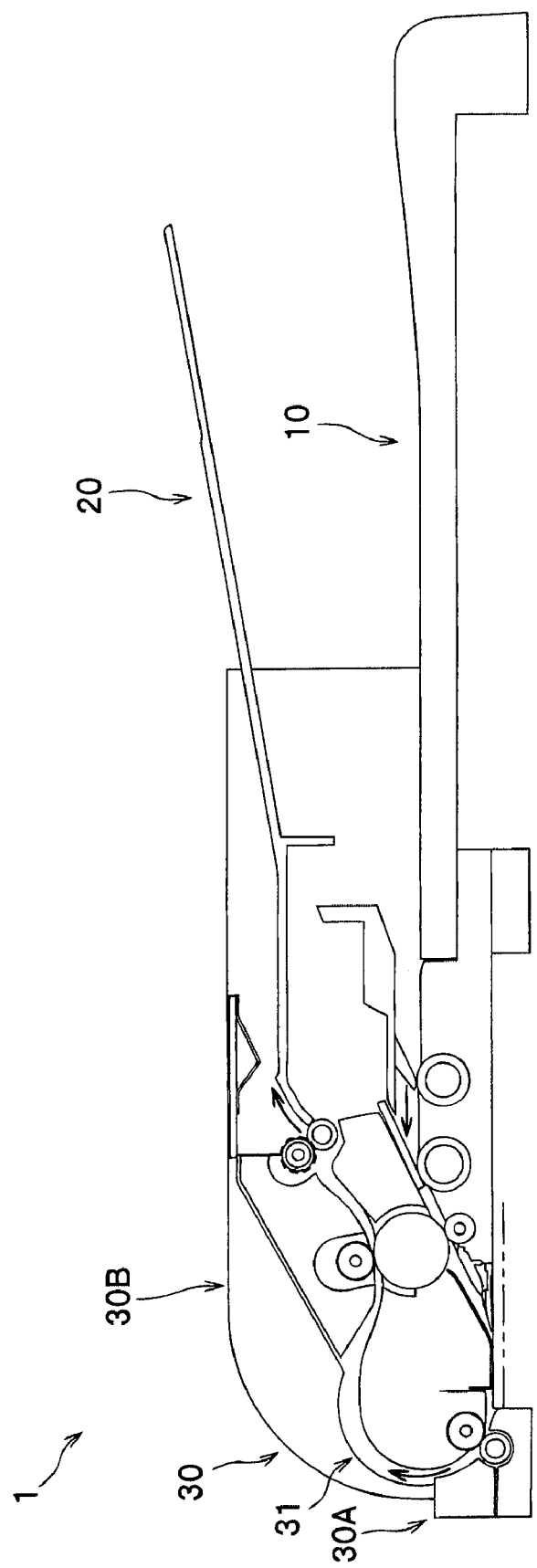
FIG. 1 is a cross-sectional view showing the overall configuration of a document feeding device in accordance with a first embodiment of the aspects of the present invention.

Referring now to the drawings, a description will be given in detail of preferred embodiments in accordance with the aspects of the present invention.

Embodiment 1

<Overall Configuration of Document Feeding Device>

Figure 2:
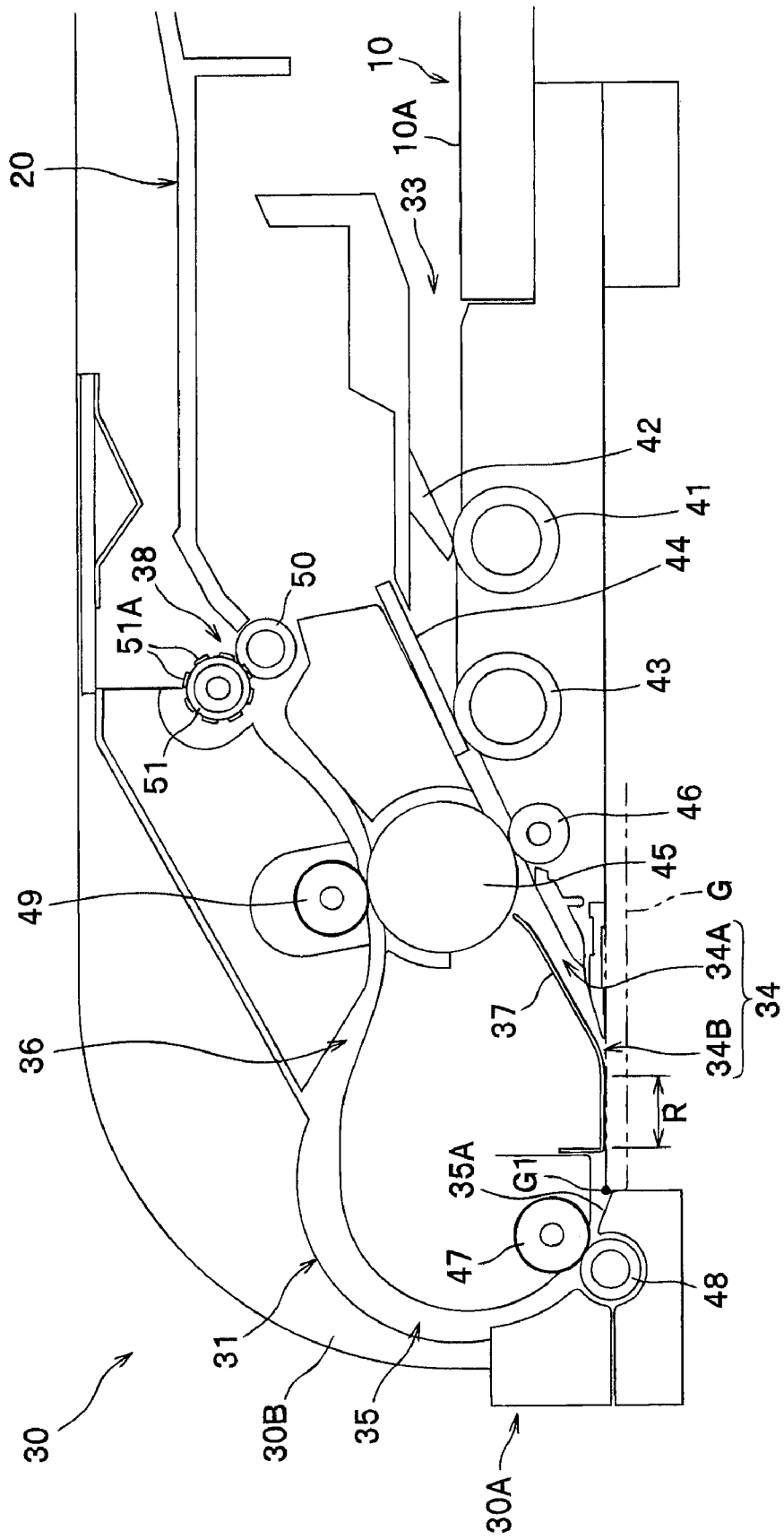
FIG. 2 is a cross-sectional view showing the configuration of a document feeding unit of the document feeding device.

FIG. 1 is a cross-sectional view showing the overall configuration of a document feeding device in accordance with a first embodiment of the aspects of the present invention. FIG. 2 is a cross-sectional view showing the configuration of a document feeding unit of the document feeding device.

As shown in FIG. 1, the document feeding device 1 of this embodiment mainly includes a document input tray 10, a document output tray 20 and a document feeding unit 30.

The document input tray 10, as a part on which documents to be scanned (i.e. documents to be fed) are placed, is situated in a lower right part of the document feeding device 1 in FIG. 1.

The document output tray 20, as a part on which the documents after being scanned (i.e. after being ejected from the document feeding unit 30) are stacked, is situated above the document input tray 10. The detailed configuration of the document output tray 20 will be described later.

The document feeding unit 30, as a unit for feeding the document from the document input tray 10 to the document output tray 20, is situated to the left of the document input tray 10 and the document output tray 20 in FIG. 1. An outer frame of the document feeding unit 30 includes a body frame 30A and a cover 30B which is rotatable with respect to the body frame 30A around an axis in a lower left part in FIG. 1. A feeding path 31 for feeding the document is formed mainly by the body frame 30A and the cover 30B. In the document feeding unit 30, the feeding path 31 is equipped with a feeding mechanism which will be explained later.

In the following explanation, the traveling direction of the document being fed from the document input tray 10 to the document output tray 20 through the feeding path 31 (indicated by arrows in FIG. 1) will be referred to as a "feeding direction". Expressions "upstream side" and "downstream side" in the following explanation mean "upstream side in the feeding direction" and "downstream side in the feeding direction", respectively.

<Configuration of Feeding Path>

As shown in FIG. 2, the feeding path 31 (formed substantially in a U-shape) is a path connecting the document input tray 10 and the document output tray 20 via a scanning position R. The feeding path 31 is made up of an intake path 33, a lower feeding path 34, a curved path 35 and an upper feeding path 36.

The intake path 33 continuously extends from a loading surface 10A of the document input tray 10 toward the downstream side substantially in a horizontal direction. In the intake path 33, a guide surface is formed by the body frame 30A.

The lower feeding path 34 includes a sloped part 34A extending from the downstream end of the intake path 33 toward the lower left in FIG. 2 and a horizontal part 34B extending downstream substantially in a horizontal direction from the downstream end of the sloped part 34A. In the lower feeding path 34, a lower guide surface of the sloped part 34A is formed by the body frame 30A, while an upper guide surface of the sloped part 34A and the horizontal part 34B is formed by a document guide 37. The bottom of the horizontal part 34B is open (as the scanning position R) so as to expose the document for the scanning.

The document guide 37 mainly includes a sloped part and a horizontal part corresponding to the sloped part 34A and the horizontal part 34B of the lower feeding path 34. The horizontal part of the document guide 37 holds down the document being exposed at the scanning position R. Incidentally, in cases where the document feeding device 1 is used with (installed in) a copier, MFP (Multi-Function Peripheral), etc., platen glass G of a document scanner (unshown) of a well-known type is provided under the horizontal part of the document guide 37. A scan target surface of the document, fed to the scanning position R through the horizontal part 34B while being sandwiched between the document guide 37 and the platen glass G, is scanned by an unshown document scanning unit (e.g. image sensor) placed beneath the platen glass G.

The curved path 35, extending upward like an arc from the downstream end of the lower feeding path 34 (horizontal part 34B), changes the feeding direction by approximately 180 degrees (leftward to rightward in FIG. 2). In the curved path 35, a guide surface is formed by the body frame 30A and the cover 30B. Although not illustrated, a part of the curved path 35 can be exposed by rotating and opening the cover 30B, through which a document jammed in the feeding path 31 can be removed.

Incidentally, a guide surface 35A, sloping from a position under the upper edge of the downstream end of the platen glass G toward a nipping position of a second feeding roller 47 and a pinch roller 48 (explained later), is formed at the bottom of the curved path 35 at its upstream end, by which the document being fed on the platen glass G is smoothly fed to the curved path 35 without getting snagged.

The upper feeding path 36 extends from the downstream end of the curved path 35 toward the document output tray 20. In the upper feeding path 36, a guide surface is formed by the body frame 30A. The downstream end of the upper feeding path 36 serves as a document outlet 38.

<Configuration of Feeding Mechanism>

The feeding path 31 is equipped with the feeding mechanism, which feeds the document from the document input tray 10 to the scanning position R, and to the document output tray 20. In this embodiment, the feeding mechanism is mainly composed of an intake roller 41, an intake pad 42, a separation roller 43, a separation pad 44, a first feeding roller 45, the second feeding roller 47, an ejection roller 50 and pinch rollers 46, 48, 49 and 51.

The intake roller 41, for pulling the documents placed on the document input tray 10 toward the separation roller 43, is situated to expose its top from the bottom of the intake path 33 at a position near the midpoint of the intake path 33. The intake roller 41 is driven and rotated by driving force transmitted from an unshown motor.

The intake pad 42, for pressing the documents against the intake roller 41 to let the intake roller 41 pull the documents steadily, is situated to face the intake roller 41 from above. The intake pad 42, capable of pivoting up and down, is constantly biased toward the intake roller 41.

The separation roller 43, for sending out the documents one by one, is situated to expose its top from the bottom of the intake path 33 at the downstream end of the intake path 33. The separation roller 43 is driven and rotated by driving force transmitted from the unshown motor.

The separation pad 44, for pressing the documents against the separation roller 43 to let the separation roller 43 separate and send out a document with reliability, is situated to face the separation roller 43 from above. The separation pad 44, capable of pivoting up and down, is constantly biased toward the separation roller 43.

The first feeding roller 45, for feeding the document inside the feeding path 31, is situated to expose its bottom from the top of the lower feeding path 34 (sloped part 34A) at a position near the midpoint of the sloped part 34A while exposing its top from the bottom of the upper feeding path 36 at a position near the midpoint of the upper feeding path 36. The first feeding roller 45 is driven and rotated by driving force transmitted from the unshown motor.

The pinch roller 46 is situated at a position near the midpoint of the sloped part 34A, with its top (exposed from the bottom of the sloped part 34A) contacting the first feeding roller 45.

The second feeding roller 47, for feeding the document from the scanning position R toward the document output tray 20, is situated to expose its bottom from the top of the curved path 35 at a position near the upstream end of the curved path 35. The second feeding roller 47 is driven and rotated by driving force transmitted from the unshown motor.

The pinch roller 48 is situated at a position near the upstream end of the curved path 35, with its top (exposed from the bottom of the curved path 35) contacting the second feeding roller 47.

The pinch roller 49 is situated at a position near the midpoint of the upper feeding path 36, with its bottom (exposed from the top of the upper feeding path 36) contacting the first feeding roller 45.

The ejection roller 50, for ejecting the document to the document output tray 20, is situated at the document outlet 38. The ejection roller 50 is driven and rotated by driving force transmitted from the unshown motor.

The pinch roller 51 is situated at the document outlet 38 to contact the ejection roller 50 from above. At both ends of the pinch roller 51 in its axial direction, a plurality of projections 51A, for pushing out the document (to be ejected) by making contact with the upstream end of the document in the feeding direction, are formed around the periphery of the pinch roller 51.

Since the pinch rollers 46, 48, 49 and 51 are biased by unshown biasing members toward the corresponding rollers 45, 47, 45 and 50, respectively, the document can be pressed against the rollers 45, 47 and 50, by which the document can be fed with reliability.

<Operation of Document Feeding Unit>

Figure 3:
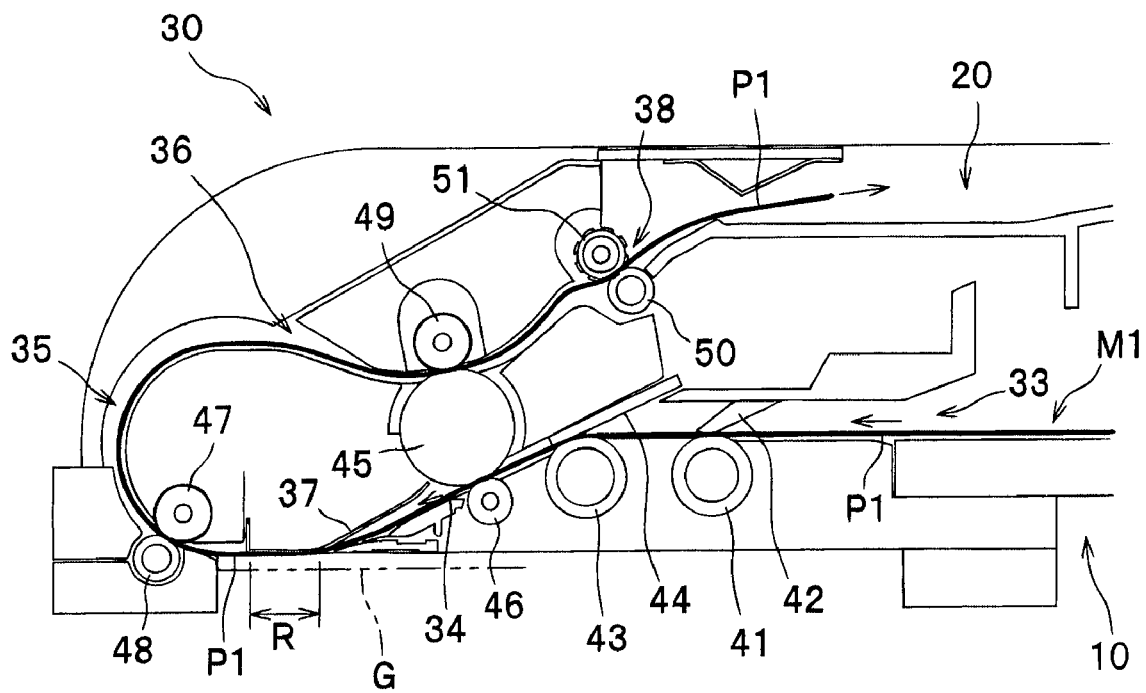
FIG. 3 is a cross-sectional view showing the operation of the document feeding unit.

Here, the operation of the document feeding unit 30 configured as above will be described. FIG. 3 is a cross-sectional view showing the operation of the document feeding unit 30. As shown in FIG. 3, a document M placed on the document input tray 10 with its scan target surface P1 facing downward is pulled toward the separation roller 43 by the intake roller 41 and the intake pad 42 and then fed to the lower feeding path 34 by the separation roller 43 and the separation pad 44. Then, the document M is fed by the first feeding roller 45 and the pinch roller 46 to the scanning position R with its scan target surface P1 facing downward. At the scanning position R, the scan target surface P1 of the document M is scanned by a well-known document scanner. Thereafter, the document M is fed through the curved path 35 and the upper feeding path 36 by the second feeding roller 47 (with the pinch roller 48) and the first feeding roller 45 (with the pinch roller 49) and then ejected to the document output tray 20 through the document outlet 38 by the ejection roller 50 and the pinch roller 51, with its scan target surface P1 facing upward.

<Configuration of Document Output Tray>

Figure 4:
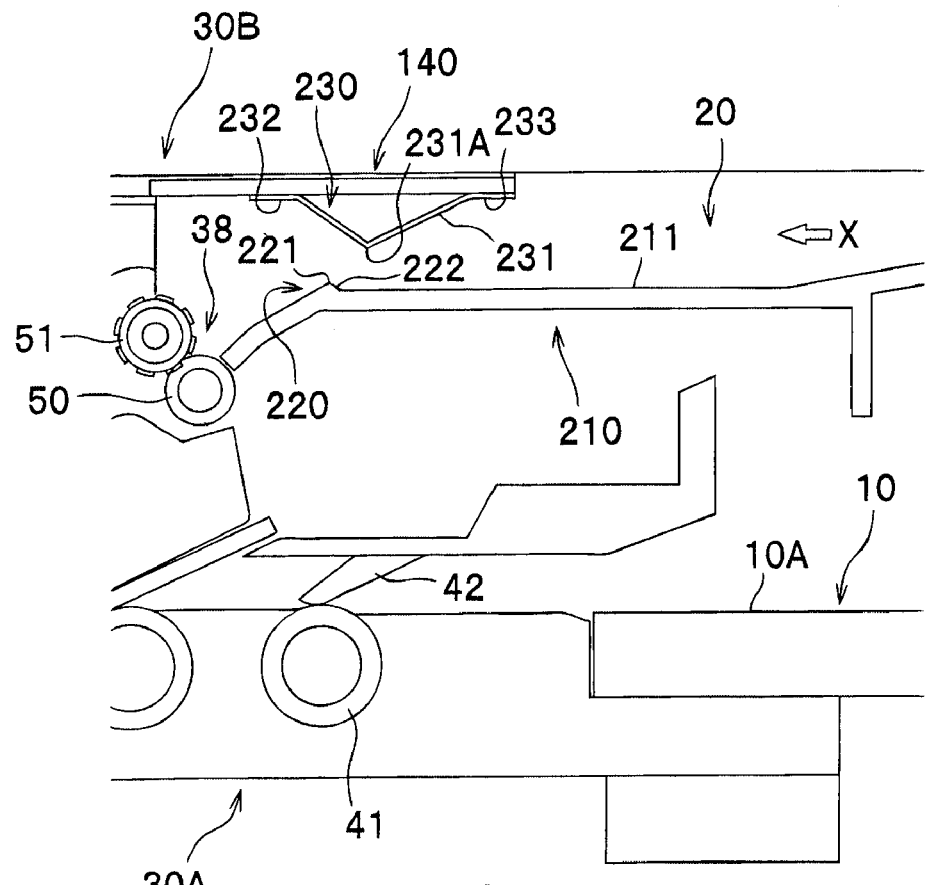
FIG. 4 is a partial cross-sectional view showing the configuration of a document output tray of the document feeding device.
Figure 5:
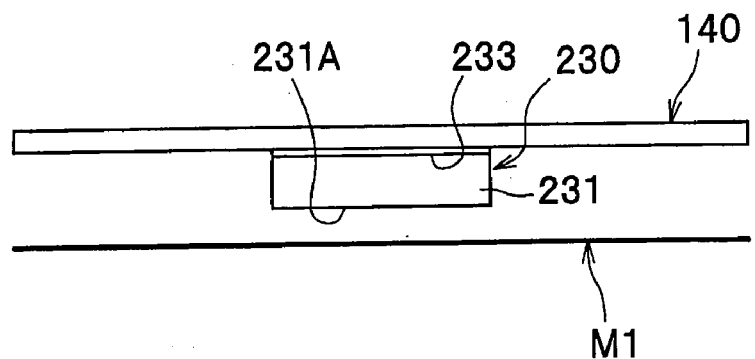
FIG. 5 is a schematic diagram showing a pressing member of the document feeding device viewed in the direction of arrow X in FIG. 4.

Next, the configuration of the document output tray 20 (a feature of this embodiment) will be described. FIG. 4 is a partial cross-sectional view showing the configuration of the document output tray 20. FIG. 5 is a schematic diagram showing a pressing member of the document feeding device 1 viewed in the direction of arrow X in FIG. 4.

In the following explanation, a part of the document on the downstream side will be referred to as a "front end part" or "front end" and a part of the document on the upstream side will be referred to as a "rear end part" or "rear end".

As shown in FIG. 4, the document output tray 20 is mainly composed of a tray part 210, a projecting part 220 formed on the upstream side of the tray part 210, and a pressing member 230 placed over the projecting part 220.

The tray part 210 is situated over the loading surface 10A of the document input tray 10. The upper surface of the tray part 210 serves as a holding surface 211 for holding documents that have been ejected.

The projecting part 220 is formed in a part on the upstream side of the tray part 210 (approximately over the intake roller 41 and the intake pad 42) so as to project from the tray part 210 and have an apex 221 higher than the nipping position of the ejection roller 50 and the pinch roller 51. The projecting part 220, formed substantially in a mountain shape on the holding surface 211 of the tray part 210, has a downward slope 222 descending downstream from the apex 221. When a document is ejected to the document output tray 20, a rear end part of the document is placed on the projecting part 220 and pushed up by the projecting part 220, by which the rear end of the document is lifted from the document output tray 20 (see FIG. 6).

The pressing member 230, formed by a thin plate-like resin sheet, includes a pressing part 231 (substantially in a V-shape) and two attaching parts 232 and 233 extending outward (frontward/rearward) substantially horizontally from both ends of the pressing part 231 in the feeding direction. The pressing member 230 is attached to the lower surface of a document pressing plate 140 (provided over the projecting part 220) so that the attaching parts 232 and 233 are placed at the center of the document pressing plate 140 in the width direction of the document M1 ejected to the document output tray 20 (horizontal direction in FIG. 5, orthogonal to the feeding direction) as shown in FIG. 5. Incidentally, the document pressing plate 140 is formed by the cover 30B so as to extend downstream (rightward in FIG. 4) like an eaves from over the document outlet 38 as shown in FIG. 4.

The pressing member 230 is placed so that its pressing part 231 (lower end 231A) faces the downward slope 222 of the projecting part 220 while keeping a prescribed distance. Thus, a document ejected to the tray part 210 (i.e. placed on the projecting part 220 and the holding surface 211) is sandwiched between the pressing part 231 (lower end 231A) and the downward slope 222.

Incidentally, the aforementioned "prescribed distance" is set so that the pressing part 231 makes contact from above with the uppermost one of the documents ejected and stacked on the tray part 210 (projecting part 220, holding surface 211) when a prescribed number of documents (e.g. 20 documents) have been stacked up. With this configuration, the documents ejected to the tray part 210 (projecting part 220, holding surface 211) are securely held between the pressing part 231 and the projecting part 220 (downward slope 222) when the prescribed number of documents have been stacked up.

<Action and Effect>

Figure 6:
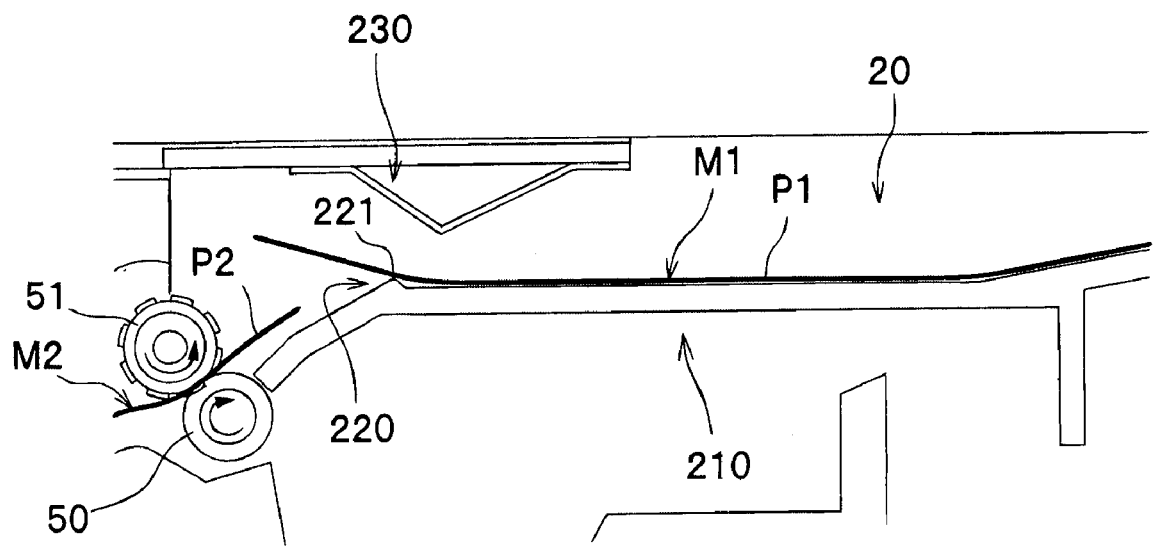
FIG. 6 is a partial cross-sectional view for explaining a state of a document that is ejected second or later.
Figure 7A:
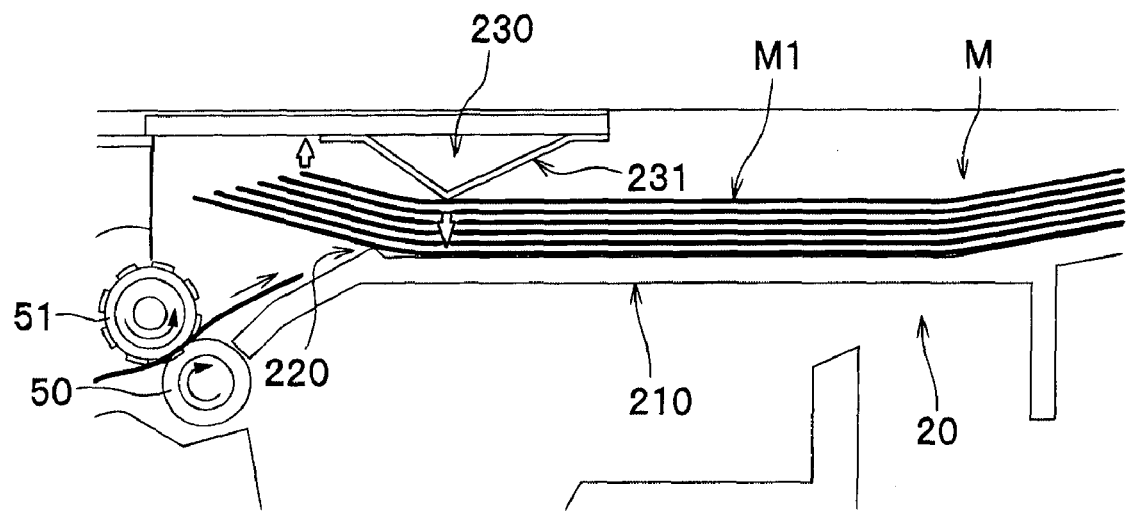
FIG. 7A is a partial cross-sectional view showing a state of documents ejected to the document output tray according to the first embodiment.
Figure 7B:
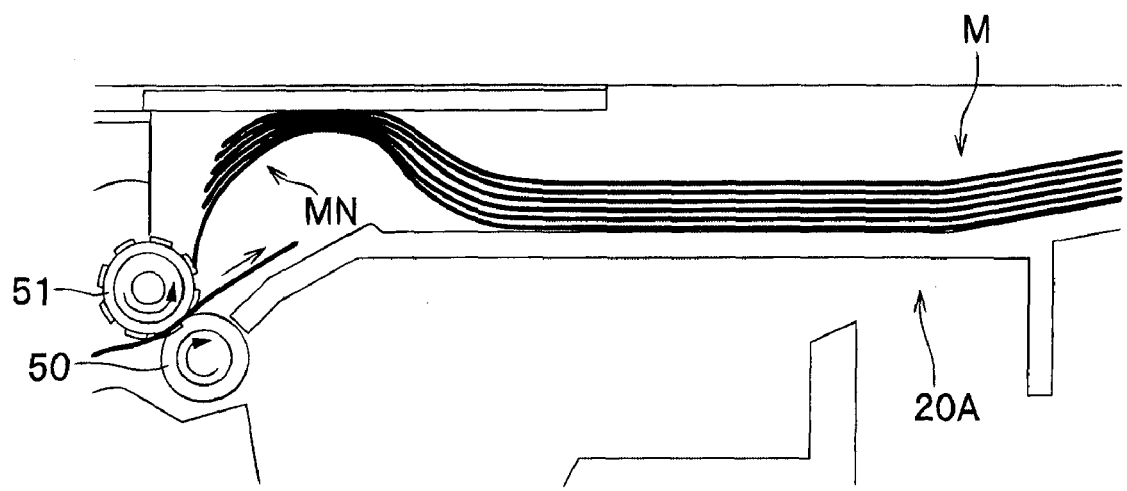
FIG. 7B is a partial cross-sectional view showing a state of documents ejected to a document output tray (as a comparative example) which is not equipped with the pressing member.

The action and effect of the document output tray 20 configured as above will be explained below. FIG. 6 is a partial cross-sectional view for explaining a state of a document that is ejected second or later. FIG. 7A is a partial cross-sectional view showing a state of documents ejected to the document output tray 20 according to this embodiment. FIG. 7B is a partial cross-sectional view showing a state of documents ejected to a document output tray (as a comparative example) which is not equipped with the pressing member.

As show in FIG. 6, the rear end part of the documents M1 already ejected to the document output tray 20 stays lifted by the projecting part 220 (apex 221) from the document output tray 20. In this state, the front end of the next document M2 fed by the ejection roller 50 and the pinch roller 51 makes contact with the lower surface of the rear end part of the stack of documents M1 and thereafter the document M2 is ejected while directly sliding under the stack of documents M1. Since the documents M1 have been ejected to the document output tray 20 with their scan target surfaces P1 facing upward, the documents M and M2 can be arranged in the normal order (with their scan target surfaces P1 and P2 facing upward and with the scan target surface P2 placed under the scan target surfaces P1) by ejecting the next document M2 (with its scan target surface P2 facing upward) while sliding it under the already ejected documents M1.

As shown in FIG. 7B (comparative example), as the number of documents already ejected to the document output tray 20A increases, it becomes difficult for the next document to slide under the stack M of already ejected documents since the frictional resistance between the documents increases as the weight of the document stack M increases. Thus, due to the ejection speed exceeding the sliding speed, the rear end part of the currently ejected document gradually arches upward and finally bends downward after being ejected, by which the rear end of the document can make contact with the pair of ejection rollers (specifically, at least one of the ejection roller 50 and the pinch roller 51) like the document MN shown in FIG. 7B. In this state, the rotation of the pair of ejection rollers can cause noise or damage to the rear end of the document MN.

On the other hand, in the document output tray 20 according to this embodiment (see FIG. 7A), the pressing part 231 of the pressing member 230 makes contact from above with the uppermost document M1 (which has been ejected first) in the stack M of ejected documents on the tray part 210 when a prescribed number of ejected documents have been stacked up (i.e. when the number of documents in the document stack M reaches a prescribed number). As more documents are ejected, the document stack M (getting thicker) starts being pressed by the pressing part 231 from above, by which the rear end part of the document stack M is pushed up by the projecting part 220 (apex 221) functioning as a fulcrum.

As described above, by the document output tray 20 in accordance with the first embodiment of the aspects of the present invention, the rear end of the document stack M (ejected documents) can be lifted up by the function of the pressing member 230 and the projecting part 220, by which the bending down of the rear end of the ejected documents can be prevented. Thanks to the pushing up of the rear end part of the ejected documents, the rear end can be separated from the pair of ejection rollers (ejection roller 50 and pinch roller 51) while forming a gap between the document output tray 20 and the rear end part of the document stack M, by which the sliding of the next document under the document stack M is facilitated. Consequently, the contact of the rear end of an already ejected document with the pair of ejection rollers can be prevented, by which the noise and damage to the rear end (which can be caused by contact of the rear end with the pair of ejection rollers) can be prevented.

In this embodiment, the pressing member 230 (lower end 231A) is placed to face the downward slope 222 of the projecting part 220 and to sandwich the ejected documents between the downward slope 222 and itself. Thus, the pressing member 230 is capable of making contact with the ejected documents from above in the vicinity of the projecting part 220 (apex 221) functioning as the fulcrum, by which the rear end part of the ejected documents can be pushed up and lifted with reliability.

Further, since the pressing member 230 is placed keeping a prescribed distance (gap) from the downward slope 222 so as to sandwich the ejected documents between the downward slope 222 and itself when a prescribed number of ejected documents have been stacked up, it is possible to make the pressing member 230 start functioning when the bending down of the rear end of an ejected document starts (specifically, when the number of documents stacked up reaches a number at which such a phenomenon occurs). In other words, the pressing member 230 can be prevented from functioning when each document can smoothly slide under the already ejected documents (i.e. when the bending down of the rear end of an ejected document does not occur).

Since the pressing member 230 is placed at the center in the document width direction, the document can be prevented from being ejected obliquely with respect to the feeding direction. If the pressing member is placed on one side in the document width direction, the document making contact with the pressing member turns around the contact point and is ejected obliquely with respect to the feeding direction. While the oblique ejection of the document can of course be prevented by symmetrically placing two pressing members (on both sides in the document width direction), the cost can be reduced and the manufacturing process can be simplified by placing one pressing member 230 at the center as in this embodiment. Further, the pressing member 230, which is formed of a resin sheet, can be manufactured at a low cost.

Incidentally, the document M1 at the scanning position R is fed from the center to the downstream end of the platen glass G (from right to left in FIG. 3) as shown in FIG. 3 in the document feeding device 1 of this embodiment. Thus, the platen glass G (scanning glass) of the document feeding device can be formed by a sheet of glass (transparent material). Suppose that the document M1 is fed in the opposite direction (from the left end toward the center of the platen glass G) in the configuration of FIG. 3, the document M1 shoots into a gap between the upper surface of the platen glass G and the lower surface of the document feeding device 1 and the feeding of the document M1 to the document output tray situated to the upper right (the document input tray 10 in this embodiment) becomes impossible. Thus, in cases where the document M1 is fed in the opposite direction (opposite to the feeding direction in FIG. 3), the platen glass G has to be separated into two at a position to the right of the scanning position R and a sloped surface (with its lower end situated slightly below the upper surface of the platen glass G and its upper end situated to the upper right) has to be provided between the two sheets of platen glass G so that the document M1 can be fed to the document output tray situated to the upper right without letting the document M1 shoot into the gap between the upper surface of the platen glass G and the lower surface of the document feeding device 1. While the platen glass G has to be separated into two in cases where the document M1 is fed in such a direction (opposite to that in FIG. 3), the document M1 is fed in the feeding direction shown in FIG. 3 in the document feeding device 1 of this embodiment, by which the platen glass G can be formed by a sheet of glass (transparent material) and the document scanner can be downsized. Consequently, miniaturization of the device (scanner, MFP, copier, etc.) in which the document feeding device 1 is installed can be realized.

Embodiment 2

Figure 8:
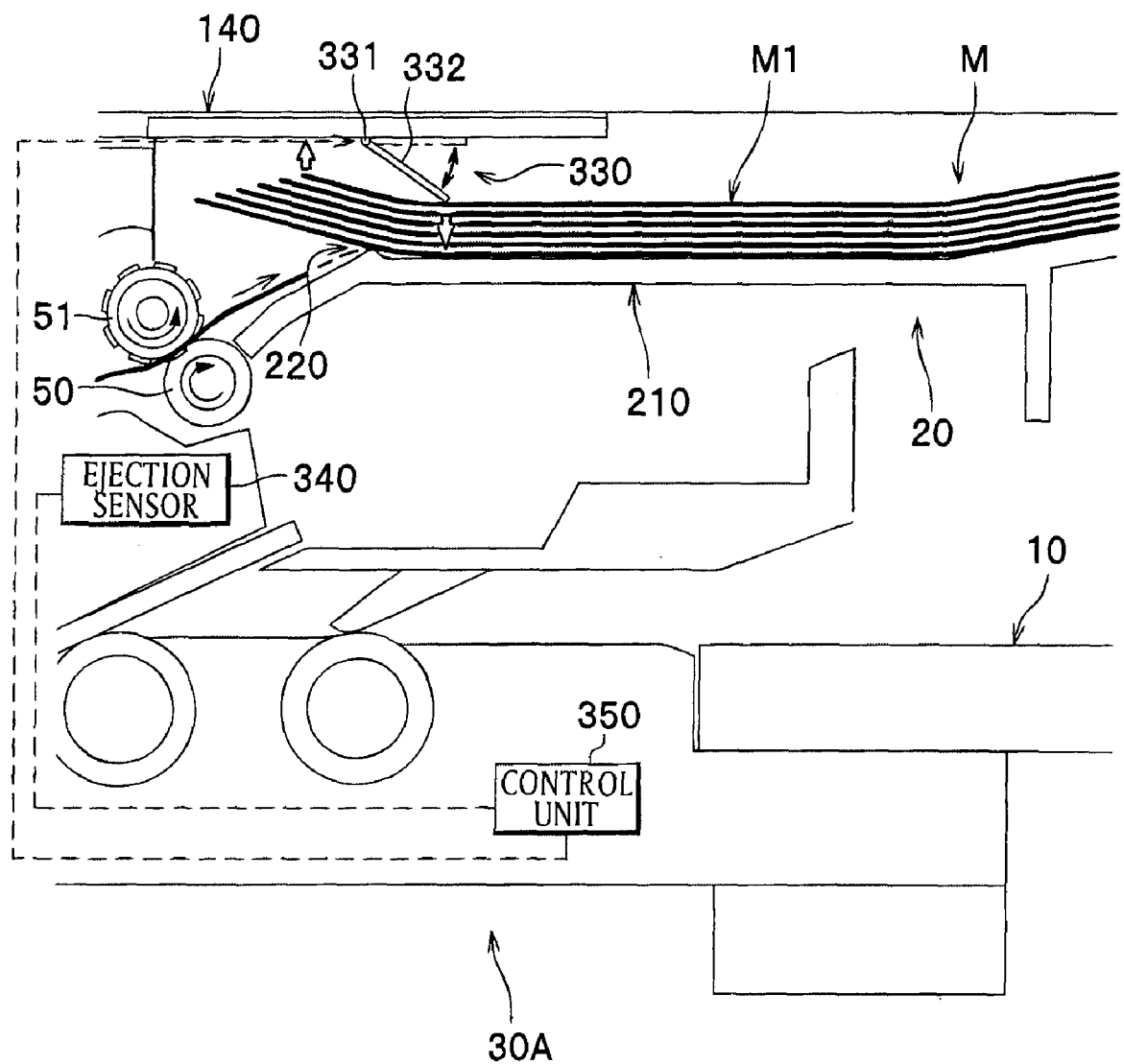
FIG. 8 is a schematic cross-sectional view showing the configuration of a pressing member of a document feeding device in accordance with a second embodiment of the aspects of the present invention.

In the following, a second embodiment according to aspects of the present invention will be described. FIG. 8 is a schematic cross-sectional view showing the configuration of a pressing member of a document feeding device in accordance with the second embodiment.

The second embodiment differs from the above first embodiment mainly in the configuration of the pressing member. In the explanation of the second embodiment, components identical or equivalent to those in the first embodiment are assigned the same or similar reference characters as those in the first embodiment and repeated explanation thereof is omitted for brevity.

As shown in FIG. 8, the pressing member 330 in the second embodiment is mainly composed of an axial part 331 and a pressing part 332 extending downstream from the axial part 331. The axial part 331 is supported on the lower surface of the document pressing plate 140 to be rotatable. The pressing part 332 is attached to the axial part 331 so that its downstream end can pivot with respect to the document pressing plate 140 around the axial part 331. The downstream end of the pressing part 332 makes contact with the document stack M from above by pivoting downward.

To the axial part 331, an unshown driver (e.g. solenoid) for driving the pressing part 332 is connected. The pressing part 332 driven by the driver is capable of shifting (pivoting) between a contacting position (indicated with solid lines in FIG. 8) for contacting the document stack M and a retracted position (indicated with chain lines in FIG. 8) for separating from the document stack M.

The document feeding device of the second embodiment is equipped with an ejection sensor 340 placed in the vicinity of the ejection roller 50 for detecting the passage of each document and a control unit 350 placed in an appropriate position inside the body frame 30A and controlling the overall operation of the document feeding device. The control unit 350 controls the shifting (pivoting) of the pressing member 330 (pressing part 332) by controlling the driver based on the detection by the ejection sensor 340.

For example, the control unit 350 counts the number of documents ejected to the tray part 210 based on the detection by the ejection sensor 340 and executes the control so as to place the pressing member 330 (pressing part 332) at the retracted position until a prescribed number of documents are stacked up on the tray part 210 (i.e. counted) and at the contacting position after the prescribed number of documents have been stacked up (i.e. counted), by which effects similar to those of the first embodiment described above can be achieved.

The control unit 350 may also be configured to execute the control so as to shift the pressing member 330 (pressing part 332) between the contacting position and the retracted position during the ejection of each document. For example, it is possible for the control unit 350 to consider that the front end of each document passes over the projecting part 220 a prescribed time period after the front end of the document is detected by the ejection sensor 340. Taking advantage of this, the control unit 350 executes the control so as to place the pressing part 332 at the contacting position until the front end of a currently ejected document passes over the projecting part 220 and to shift the pressing part 332 to the retracted position after the front end has passed over the projecting part 220.

With this configuration, the rear end part of the document stack M is pushed up by the projecting part 220 when the pressing part 332 is at the contacting position, by which the sliding of each document under the document stack M is facilitated and the noise and damage to the rear end of an ejected document (which can be caused by contact of the rear end with the pair of ejection rollers) can be prevented.

If the pressing part 332 keeps contacting the document stack M from above even after the currently ejected document has started sliding under the document stack M, the frictional resistance between the document and the document stack M increases and that hinders the movement of the document toward the downstream side. On the other hand, by the aforementioned control by the control unit 350 (so as to shift the pressing part 332 to the retracted position after the front end of the currently ejected document has passed over the projecting part 220), the frictional resistance between the document and the document stack M is reduced since the document stack M is not pressed down by the pressing part 332, by which the document can be smoothly fed toward the downstream side.

Embodiment 3

Figure 9A:
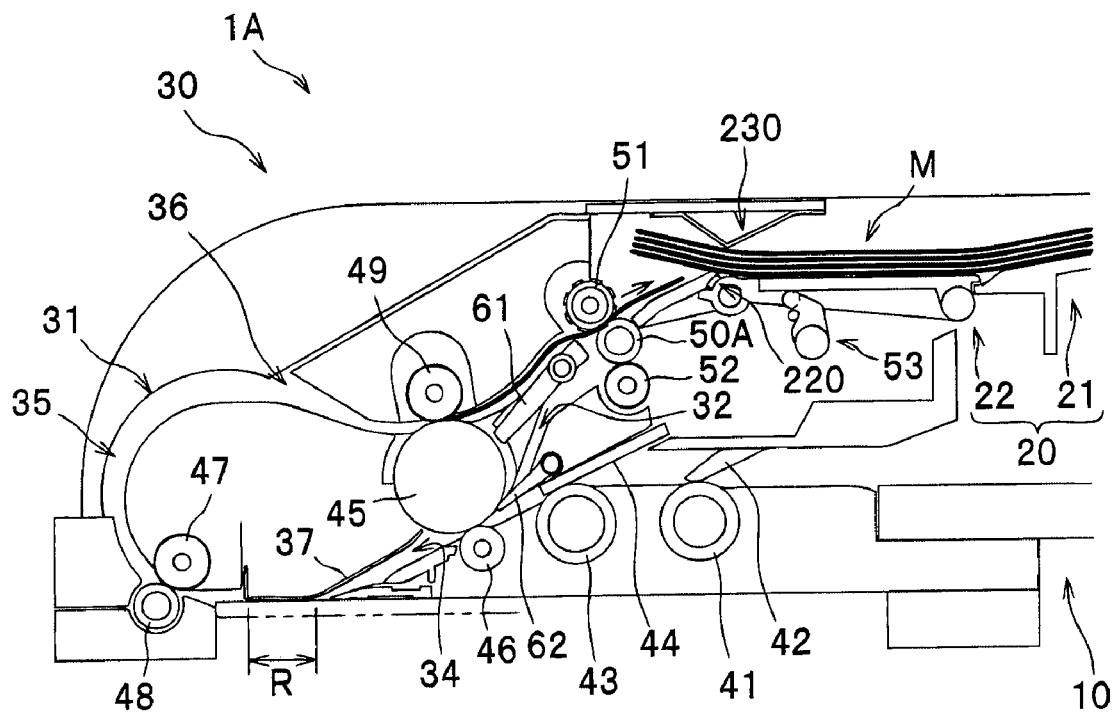
FIG. 9A is a cross-sectional view showing a single-side scan state of a document feeding device in accordance with a third embodiment of the aspects of the present invention.
Figure 9B:
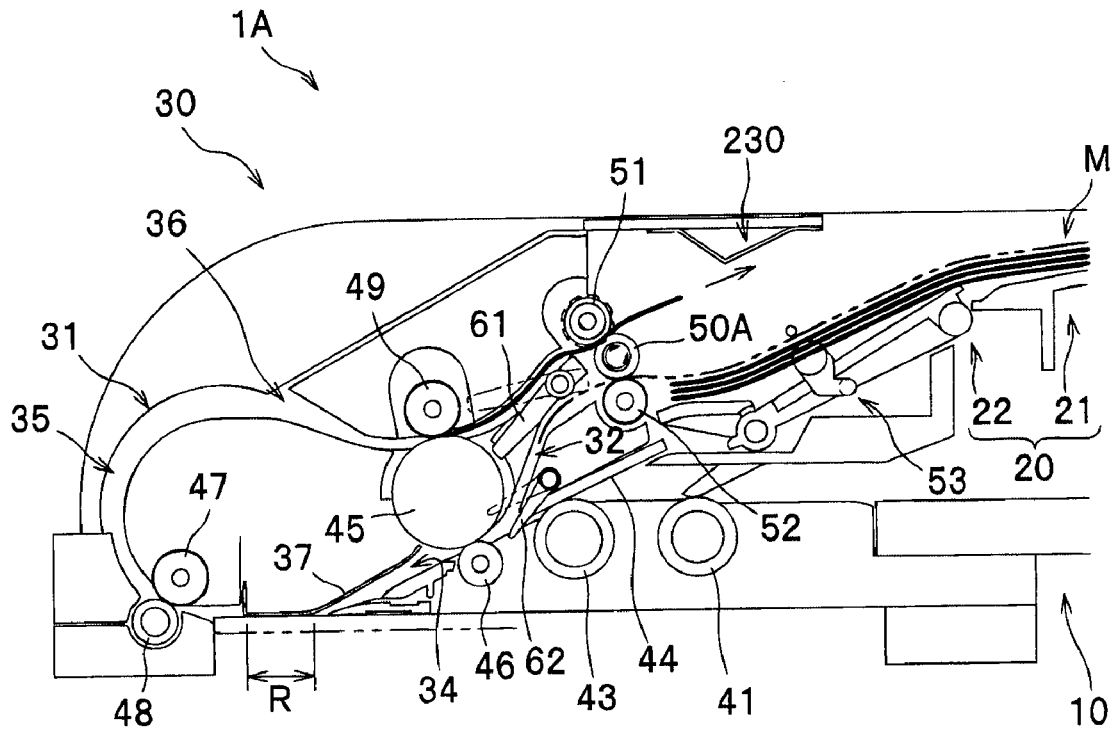
FIG. 9B is a cross-sectional view showing a double-side scan state of the document feeding device in accordance with the third embodiment.

In the following, a third embodiment according to aspects of the present invention will be described. FIG. 9A is a cross-sectional view showing a single-side scan state of a document feeding device in accordance with the third embodiment. FIG. 9B is a cross-sectional view showing a double-side scan state of the document feeding device in accordance with the third embodiment.

In the following explanation of the third embodiment, the difference from the first embodiment will be mainly described, wherein components equivalent to those in the first embodiment are assigned the same reference characters as those in the first embodiment and repeated explanation thereof is omitted for brevity.

As shown in FIGS. 9A and 9B, the document feeding device 1A of the third embodiment is configured to be capable of feeding documents for both single-side scan and double-side scan. In the document feeding device 1A, a turnover path 32 (connected to the feeding path 31) is formed in order to return each document after undergoing the single-side scan to the scanning position R. The turnover path 32 is equipped with a turnover mechanism which returns the document after passing through the scanning position R to a position on the upstream side of the scanning position R in the feeding direction (lower feeding path 34) while interchanging the front end and the rear end of the document in the feeding direction (and turning over the document). The turnover mechanism is mainly composed of first and second guide members 61 and 62 for switching the path of the document by pivoting up and down, a switchback roller 50A whose rotational direction can be changed, and a pinch roller 52 contacting the switchback roller 50A from below.

The document output tray 20 of the document feeding device 1A is mainly composed of a tray part 21 which is fixed and a flap part 22 which is placed on the upstream side of the tray part 21 to be pivotable up and down around a pivot shaft. The document feeding device 1A is further equipped with a cam 53 for pivoting the flap part 22 up and down and an operation panel (unshown) for letting the user select the single-side scan or the double-side scan. Incidentally, the operation panel may also be provided on an image scanning device (scanner, MFP, copier, etc.) in which the document feeding device 1A is installed.

When the single-side scan is selected by the user through the operation panel, the cam 53 rotates counterclockwise from the state shown in FIG. 9B and thereby pivots (pushes up) the flap part 22 to the position shown in FIG. 9A. In such a single-side scan state, when a prescribed number of ejected documents have been stacked up on the document output tray 20, the pressing member 230 makes contact with the uppermost document from above and the rear end part of the document stack M is pushed up by the projecting part 220 functioning as the fulcrum, by which effects similar to those of the first embodiment described above can be achieved.

On the other hand, when the double-side scan is selected by the user through the operation panel, the cam 53 rotates clockwise from the state shown in FIG. 9A and thereby pivots (lowers) the flap part 22 to the position shown in FIG. 9B. In such a double-side scan state, each document placed on the document input tray 10 is fed by the feeding mechanism to the scanning position R, at which a front scan target surface of the document (facing downward on the document input tray 10 and at the scanning position R) is scanned. Thereafter, the document passes under the first guide member 61 which has pivoted upward (as indicated with chain lines in FIG. 9B) and is fed between the switchback roller 50A and the pinch roller 52 toward the outside.

Before the whole of the document is ejected to the outside, the rotation of the switchback roller 50A is reversed by a well-known control method, by which the document is fed to the turnover path 32 while passing under the first guide member 61 which has pivoted downward (as indicated with solid lines in FIG. 9B). The document fed to the turnover path 32 passes over the second guide member 62 which has pivoted downward (as indicated with solid lines in FIG. 9B) and is fed again to the scanning position R. Since a back scan target surface of the document is facing downward at this point, the back scan target surface is scanned at the scanning position R.

Thereafter, the document is fed through the curved path 35 and the upper feeding path 36, passes over the first guide member 61 which has pivoted downward (as indicated with solid lines in FIG. 9B), and is ejected to the document output tray 20 from between the switchback roller 50A and the pinch roller 51. Since each document is ejected with its front scan target surface facing downward and its back scan target surface facing upward, all the ejected documents can be arranged in the normal order (from the bottom) by ejecting each document while stacking it on the already ejected documents.

In the double-side scan, the flap part 22 of the document feeding device 1A is lowered, by which the upstream end of the document output tray 20 (flap part 22) is placed below the nipping position of the switchback roller 50A and the pinch roller 51, by which the rear end of the already ejected documents is situated below the front end of the currently ejected document. Thus, the document feeding device 1A is capable of ejecting each document while stacking it on the already ejected documents in the double-side scan.

In the double-side scan (in which each document being ejected is not slid under the already ejected documents), the pressing member 230 is unnecessary. In this embodiment in which the flap part 22 is lowered (retracted) and separated from the pressing member 230 when the sliding of each document under the already ejected documents is not carried out (double-side scan), it is possible to make the pressing member 230 function exclusively when the sliding of each document is carried out (single-side scan).

While a description has been given above of preferred embodiments in accordance with the aspects of the present invention, the present invention is not to be restricted by the particular illustrative embodiments and a variety of modifications, design changes, etc. are possible without departing from the scope and spirit of the present invention described in the appended claims.

For example, while the pressing member 230 is formed of a resin sheet in the above embodiments, the pressing member 230 may be formed of different materials (e.g. thin metal plate).

While the pressing member 230 is placed at the center in the document width direction in the above embodiments, it is possible, for example, to place one or more pairs of pressing members 230 symmetrically with respect to the center of the already ejected documents in the width direction. It is also possible to place a pressing member 230 at the center in the document width direction while also placing one or more pairs of pressing members 230 symmetrically with respect to the center.

While the pressing members 230 and 330 have been described as examples of the pressing member in the above embodiments, the pressing member employed in the embodiments is not to be restricted to the examples; the pressing member may also be implemented by, for example, a plate-like member attached orthogonally to the lower surface of the document pressing plate 140 or a projection-like member extending downward from the lower surface of the document pressing plate 140. Thus, the configuration of the pressing member employed is not particularly restricted as long as the pressing member is capable of making contact with the ejected documents from above and pushing up the rear end part of the documents in cooperation with the projecting part of the document output tray.

While the pressing member 230 and the downward slope 222 are placed while keeping a gap between them in the above embodiments, the pressing member and the downward slope may also be placed in contact with each other when no document has been stacked on the document output tray. In this case, it is desirable that the material, configuration, etc. of the pressing member be set so as to let the pressing member be pivotable up and down.

While the pressing member 230 (lower end 231A) is placed to face the downward slope 222 in the above embodiments, the position of the pressing member may be adjusted optimally (e.g. to the downstream side of the position in the above embodiments) depending on the specific configuration of the pressing member.

While the document output tray 20 is placed above the document input tray 10 in the above embodiments, the positional relationship of the trays 10 and 20 is not particularly restricted; the aspects of the present invention are applicable also to configurations in which the document output tray is placed below the document input tray.

The configuration of the feeding mechanism described in the above embodiments is just an example, and thus the configuration (e.g. the number, arrangement, etc. of the rollers) can be changed properly as needed. It is also possible to employ a pinch roller instead of each pad. In short, the configuration, employed members, etc. of the feeding mechanism may be changed properly without departing from the scope and spirit of the present invention.

The configuration of the feeding path 31 described in the above embodiments is just an example, and thus the configuration is not to be restricted to that in the above embodiments. In other words, the configuration of the feeding path 31 (or the configuration of the feeding mechanism) may be changed properly depending on the positional relationship between the document input tray and the document output tray, the shape, size, etc. of the document feeding unit, etc.

Incidentally, components described in different ones of the above embodiments may be implemented in combination. For example, the pressing member 330 described in the second embodiment may be employed as the pressing member for the third embodiment.

What is claimed is:

1. A document feeding device for feeding documents, comprising:
    a document input tray configured such that documents to be fed are placed thereon;
    a document output tray configured to receive the documents having been ejected; and
    a feeding mechanism which is provided for a feeding path connecting the document input tray and the document output tray via a scanning position and is configured to feed each document from the document input tray to the scanning position and from the scanning position to the document output tray,
    wherein the document output tray includes:

a tray part which is configured to hold the ejected documents;

a projecting part which is configured to push up a part of the ejected documents on the upstream side in a feeding direction and thereby lift an upstream end of the ejected documents; and a pressing member which is configured to make contact with the ejected documents from above at a position on the downstream side of the projecting part's apex in the feeding direction, the pressing member being configured to push up the upstream end of the ejected documents in cooperation with the projecting part, wherein the document feeding device is configured to eject a document under the ejected documents by sliding the document between a bottom surface of a document ejected immediately before the document being ejected and the upper surface of the tray part.

2. The document feeding device according to claim 1, wherein:

the projecting part includes a downward slope descending downstream in the feeding direction from the apex, and the pressing member is placed to face the downward slope and to sandwich the ejected documents between the downward slope and itself.

3. The document feeding device according to claim 2, wherein the pressing member is placed keeping a prescribed gap between the downward slope and itself so as to sandwich the ejected documents between the downward slope and itself when a prescribed number of ejected documents have been stacked up.

4. The document feeding device according to claim 1, wherein the pressing member is placed at the center in a document width direction which is orthogonal to the feeding direction.

5. The document feeding device according to claim 1, wherein the pressing member is formed of a resin sheet.

6. The document feeding device according to claim 1, wherein:

the pressing member includes an axial part and a pressing part extending downstream in the feeding direction from the axial part and being pivotable around the axial part, and a downstream end of the pressing part in the feeding direction is configured to make contact with the ejected documents from above when the pressing part pivots downward.

7. The document feeding device according to claim 6, further comprising:

an ejection sensor which is configured to detect passage of each document being ejected to the document output tray; and a control unit which is configured to control the pivoting of the pressing part of the pressing member based on the detection by the ejection sensor.

8. A document feeding device for feeding documents, comprising:

a document input tray configured such that documents to be fed are placed thereon;

a document output tray configured to receive the documents having been ejected; and a feeding mechanism which is provided for a feeding path connecting the document input tray and the document output tray via a scanning position and is configured to feed each document from the document input tray to the scanning position and from the scanning position to the document output tray, wherein the document output tray includes:

a tray part which is configured to hold the ejected documents;

a projecting part which is configured to push up a part of the ejected documents on the upstream side in a feeding direction and thereby lift an upstream end of the ejected documents; and a pressing member which is configured to make contact with the ejected documents from above at a position on the downstream side of the projecting part's apex in the feeding direction;

an ejection sensor which detects passage of each document being ejected to the document output tray; and a control unit which is configured to control the pivoting of the pressing part of the pressing member based on the detection by the ejection sensor, wherein the pressing member includes an axial part and a pressing part extending downstream in the feeding direction from the axial part and being pivotable around the axial part, wherein a downstream end of the pressing part in the feeding direction is configured to make contact with the ejected documents from above when the pressing part pivots downward, and wherein the control unit is configured to count the number of documents ejected to and stacked up on the document output tray based on the detection by the ejection sensor and configured to control the pivoting of the pressing part so as to place the pressing part at a retracted position until a prescribed number of documents are stacked up on the document output tray and at a contacting position after the prescribed number of documents have been stacked up on the document output tray.

9. A document feeding device for feeding documents, comprising:

a document input tray configured such that documents to be fed are placed thereon;

a document output tray configured to receive the documents having been ejected; and a feeding mechanism which is provided for a feeding path connecting the document input tray and the document output tray via a scanning position and configured to feed each document from the document input tray to the scanning position and from the scanning position to the document output tray, wherein the document output tray includes:

a tray part which is configured to hold the ejected documents;

a projecting part which is configured to push up a part of the ejected documents on the upstream side in a feeding direction and thereby lift an upstream end of the ejected documents; and a pressing member which is configured to make contact with the ejected documents from above at a position on the downstream side of the projecting part's apex in the feeding direction;

an ejection sensor which is configured to detect passage of each document being ejected to the document output tray; and a control unit which is configured to control the pivoting of the pressing part of the pressing member based on the detection by the ejection sensor, wherein the pressing member includes an axial part and a pressing part extending downstream in the feeding direction from the axial part and being pivotable around the axial part, wherein a downstream end of the pressing part in the feeding direction is configured to make contact with the ejected documents from above when the pressing part pivots downward, and wherein the control unit is configured to detect passage of a front end of a currently ejected document over the projecting part based on the detection by the ejection sensor and is configured to control the pivoting of the pressing part so as to place the pressing part at a contacting position until the front end of the currently ejected document passes over the projecting part and configured to shift the pressing part to a retracted position after the front end has passed over the projecting part.

10. The document feeding device according to claim 8, wherein the pressing member is configured to push up the upstream end of the ejected documents in cooperation with the projecting part.

11. The document feeding device according to claim 9, wherein the pressing member is configured to push up the upstream end of the ejected documents in cooperation with the projecting part.

12. The document feeding device according to claim 1, wherein the projecting part and the pressing member are configured to urge an upstream end portion of the ejected documents to a level higher than the apex of the projecting part.

13. The document feeding device according to claim 1,
wherein the feeding mechanism further includes first and second discharge rollers with a nip formed therebetween,
wherein the nip is arranged at a lower level than the apex of the projecting part.

* * * * *